(12) United States Patent
Wu

(10) Patent No.: US 11,576,066 B2
(45) Date of Patent: Feb. 7, 2023

(54) METHOD FOR MEASURING PACKET LOSS RATE, METHOD FOR OBTAINING PACKET LOSS RATE, TERMINAL, AND NETWORK DEVICE

(71) Applicant: VIVO MOBILE COMMUNICATION CO.,LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 30 days.

(21) Appl. No.: 16/951,966

(22) Filed: Nov. 18, 2020

(65) Prior Publication Data

US 2021/0075710 A1    Mar. 11, 2021

Related U.S. Application Data

(63) Continuation of application No. PCT/CN2019/084497, filed on Apr. 26, 2019.

(30) Foreign Application Priority Data

May 18, 2018    (CN) .......................... 201810481872.2

(51) Int. Cl.
*H04L 41/0677*    (2022.01)
*H04L 43/0829*    (2022.01)
(Continued)

(52) U.S. Cl.
CPC ......... *H04W 24/10* (2013.01); *H04L 41/0677* (2013.01); *H04L 43/0829* (2013.01);
(Continued)

(58) Field of Classification Search
CPC ....... H04B 17/0082–3913; H04L 5/003–0098; H04L 41/06–0896;
(Continued)

(56) References Cited

U.S. PATENT DOCUMENTS

| | | | |
|---|---|---|---|
| 2013/0114446 A1* | 5/2013 | Liu | ........................ H04W 24/10 |
| 2015/0223095 A1 | 8/2015 | Centonza et al. | |
| 2017/0013485 A1 | 1/2017 | Chang et al. | |

FOREIGN PATENT DOCUMENTS

| | | | | |
|---|---|---|---|---|
| CN | 102355692 A | | 2/2012 | |
| CN | 106162709 A | * | 11/2016 | ............ H04W 24/10 |

(Continued)

OTHER PUBLICATIONS

Kyocera, "Reporting of UL PDCP delay measurements for FeMDT," 3GPP TSG-RAN2 Meeting 93, R2-161517, pp. 1-3, (Feb. 15, 2016).
(Continued)

*Primary Examiner* — Timothy J Weidner
(74) *Attorney, Agent, or Firm* — Maschoff Brennan

(57) ABSTRACT

This disclosure provides a measurement method and an acquisition method for a packet loss rate, a terminal, and a network device. The measurement method for a packet loss rate is applicable to a terminal, and comprises: acquiring configuration information concerning an uplink packet loss rate measurement, the configuration information comprising: measurement time window information, measured service information and condition information for triggering uplink packet loss rate measurement reporting; measuring, according to the configuration information, an uplink packet loss rate; and sending report information to a network device according to the uplink packet loss rate.

17 Claims, 6 Drawing Sheets

(51) Int. Cl.
　　　H04W 24/08　　　(2009.01)
　　　H04W 24/10　　　(2009.01)
　　　H04W 28/02　　　(2009.01)
　　　H04W 76/11　　　(2018.01)
　　　H04W 76/25　　　(2018.01)
　　　H04W 84/02　　　(2009.01)
　　　H04W 88/02　　　(2009.01)
　　　H04W 88/08　　　(2009.01)
　　　H04W 92/02　　　(2009.01)
　　　H04W 92/10　　　(2009.01)
(52) U.S. Cl.
　　　CPC ....... *H04W 24/08* (2013.01); *H04W 28/0205* (2013.01); *H04W 28/0236* (2013.01); *H04W 28/0252* (2013.01); *H04W 28/0268* (2013.01); *H04W 76/11* (2018.02); *H04W 76/25* (2018.02); *H04W 84/02* (2013.01); *H04W 88/02* (2013.01); *H04W 88/08* (2013.01); *H04W 92/02* (2013.01); *H04W 92/10* (2013.01)
(58) Field of Classification Search
　　　CPC ...... H04L 43/02–50; H04W 8/22–245; H04W 24/02–10; H04W 28/02–26; H04W 36/0005–385; H04W 48/02–20; H04W 72/005–14; H04W 74/002–008; H04W 76/10–50; H04W 84/02–16; H04W 88/005–12; H04W 92/02; H04W 92/04; H04W 92/10
　　　See application file for complete search history.

(56) References Cited

FOREIGN PATENT DOCUMENTS

| CN | 106162709 A | 11/2016 | |
|---|---|---|---|
| WO | WO-2012136067 A1 * | 10/2012 | ............ H04W 24/10 |
| WO | 2015/143704 A1 | 10/2015 | |

OTHER PUBLICATIONS

Extended European Search Report dated Jun. 10, 2021 as received in Application No. 19802534.8.
Catt, R2-143524, Analysis on Layer 2 Measurements Considering Dual Connectivity, 3GPP TSG RAN WG2 Meeting #87, Dresden, Germany, Aug. 22, 2014.
Samsung, R2-144166, L2 Measurements in Dual Connectivity, 3GPP TSG RAN WG2 #87bis, Shanghai, China, Oct. 10, 2014.
Vivo, R2-1708505, UL Path Change Conditions for Split Bearer, 3GPP TSG-RAN WG2 Meeting #99, Berlin, Germany, Aug. 21-25, 2017.
International Search Report and Written Opinion issued in corresponding application No. PCT/CN2019/084497, dated Dec. 3, 2020.

* cited by examiner

METHOD FOR MEASURING PACKET LOSS RATE, METHOD FOR OBTAINING PACKET LOSS RATE, TERMINAL, AND NETWORK DEVICE

CROSS REFERENCE TO RELATED APPLICATIONS

This application is a continuation application of PCT Application No. PCT/CN2019/084497 filed on Apr. 26, 2019, which claims priority to Chinese Patent Application No. 201810481872.2 filed in China on May 18, 2018, which are incorporated herein by reference in their entireties.

TECHNICAL FIELD

The present disclosure relates to the field of communications technologies, and in particular, to a method for measuring a packet loss rate, a method for obtaining a packet loss rate, a terminal, and a network device.

BACKGROUND

A plurality of layer-2 measurements are introduced in a long term evolution (LTE) system. A packet loss rate (which may also be referred to as PLR for short) of an uplink service of user equipment (UE) (which is also referred to as a terminal) may be calculated on a network side. The packet loss rate is calculated by determining, based on a packet data convergence protocol (PDCP) sequence number, a quantity of numbers lost in a specified time window.

In a 5-generation (5G) communications system, a data flow and a protocol data unit session (PDU session) are introduced on an access network side. Different PDU sessions may include a plurality of data flows, and different data flows may identify different service types (for example, a voice service or a video service). Specifically, a schematic diagram of a data mapping flow is shown in each of FIG. 1 and FIG. 2. One data radio bearer (DRB) may include a plurality of data flows, and one or two logical channel numbers may be configured for a same DRB.

One DRB may include a plurality of data flows in a 5G system, and the data flow can be recognized only at a service data adaptation protocol (SDAP) layer. As a result, when losing a PDCP sequence number, a PDCP layer of a network side cannot determine a data flow of a lost packet, and consequently cannot accurately collect statistics on a packet loss rate of an uplink service.

SUMMARY

According to a first aspect, an embodiment of the present disclosure provides a method for measuring a packet loss rate, applied to a terminal, and including:
obtaining configuration information for measuring an uplink packet loss rate, where the configuration information includes: measurement time window information, measurement service information, and condition information for triggering reporting of an uplink packet loss rate measurement;
measuring the uplink packet loss rate based on the configuration information; and sending reporting information to a network device based on the uplink packet loss rate.

According to a second aspect, an embodiment of the present disclosure provides a method for obtaining a packet loss rate, applied to a network device, and including:
receiving reporting information sent by a terminal, where the reporting information is obtained and sent by a terminal after the terminal measures an uplink packet loss rate based on configuration information, and the configuration information includes: measurement time window information, measurement service information, and condition information for triggering reporting of an uplink packet loss rate measurement.

According to a third aspect, an embodiment of the present disclosure provides a terminal, including:
an obtaining module, configured to obtain configuration information for measuring an uplink packet loss rate, where the configuration information includes: measurement time window information, measurement service information, and condition information for triggering reporting of an uplink packet loss rate measurement;
a measurement module, configured to measure the uplink packet loss rate based on the configuration information; and
a sending module, configured to send reporting information to a network device based on the uplink packet loss rate.

Further, the obtaining module is configured to:
obtain the configuration information via at least one of a manner of configuring by the network device or a manner of specifying by a protocol.

Further, the measurement service information includes at least one of a data flow identifier, a quality of service type identifier, a protocol data unit session identifier, a cell group identifier, a data radio bearer identifier, or a logical channel identifier.

Further, the condition information for triggering reporting of an uplink packet loss rate measurement includes: at least one of preset threshold information about a packet loss rate threshold that triggers reporting, or period information about reporting of a packet loss rate measurement.

Further, the measurement module includes:
a determining unit, configured to determine a quantity of packets that are sent in an uplink direction and that are lost and a quantity of packets that are sent in the uplink direction within a preset time; and
an obtaining unit, configured to obtain the uplink packet loss rate based on the quantity of packets that are sent in the uplink direction and that are lost and the quantity of packets that are sent in the uplink direction.

Further, the uplink packet loss rate is a ratio of the quantity of packets that are sent in the uplink direction and that are lost to the quantity of packets that are sent in the uplink direction, and the packets that are sent in the uplink direction include: a packet that is sent in the uplink direction and that is lost and a packet that is successfully sent in the uplink direction.

Specifically, the packets that are sent in the uplink direction and that are lost include:
at least one of an uplink packet that is transmitted over an air interface and for which a success acknowledgement has not been received, an uplink packet that is transmitted over the air interface and for which a failure acknowledgement has been received, or an uplink packet that is transmitted over the air interface and that is determined as a receiving failure.

Specifically, the packet that is sent in the uplink direction and that is lost is an uplink packet of which at least a part of data is lost.

Specifically, the packet that is successfully sent in the uplink direction includes:
at least one of an uplink packet that is transmitted over an air interface and for which a failure acknowledgement has not been received, an uplink packet that is transmitted over an air interface and for which a success acknowledgement has been received, or an uplink packet that is transmitted over an air interface and that is determined as a receiving success.

Specifically, the packet that is successfully sent in the uplink direction is an uplink packet of which at least a part of data is successfully received.

Further, the uplink packet loss rate includes:

at least one of an uplink air interface packet loss rate of the terminal, an uplink air interface packet loss rate of a preset fifth-generation quality of service identifier, an uplink air interface packet loss rate of a first preset bearer type, an uplink air interface packet loss rate of a sending path of a second preset bearer type, an uplink air interface packet loss rate of a preset bearer, or an uplink air interface packet loss rate of a preset data flow.

Further, the uplink packet includes:

at least one of a service data adaptation protocol service data unit, a service data adaptation protocol protocol data unit, a packet data convergence protocol service data unit, a packet data convergence protocol protocol data unit, a radio link control service data unit, a radio link control protocol data unit, a medium access control service data unit, or a medium access control protocol data unit.

Further, the sending module is configured to:

send the reporting information to the network device when the condition information for triggering reporting of an uplink packet loss rate measurement in the configuration information is met.

Specifically, the reporting information includes at least one of an uplink packet loss rate, a data flow identifier, a quality of service type identifier, a protocol data unit session identifier, a cell group identifier, a data radio bearer identifier, or a logical channel identifier.

According to a fourth aspect, an embodiment of the present disclosure provides a terminal, including: a memory, a processor, and a computer program stored in the memory and executable on the processor, where when the computer program is executed by the processor, the steps of the method for measuring a packet loss rate are performed.

According to a fifth aspect, an embodiment of the present disclosure provides a network device, including:

a receiving module, configured to receive reporting information sent by a terminal, where the reporting information is obtained and sent by the terminal after the terminal measures an uplink packet loss rate based on configuration information, and the configuration information includes: measurement time window information, measurement service information, and condition information for triggering reporting of an uplink packet loss rate measurement.

According to a sixth aspect, an embodiment of the present disclosure provides a network device, including: a memory, a processor, and a computer program stored in the memory and executable on the processor, where when the computer program is executed by the processor, the steps of the method for obtaining a packet loss rate are performed.

According to a seventh aspect, an embodiment of the present disclosure provides a computer readable storage medium, where the computer readable storage medium stores a computer program, and when the computer program is executed by the processor, the steps of the method for measuring a packet loss rate or the steps of the method for obtaining a packet loss rate are performed.

DESCRIPTION OF EMBODIMENTS

To make the objectives, technical solutions, and advantages of the present disclosure clearer, the present disclosure are described in detail below with reference to the accompanying drawings and specific embodiments.

Related art of the present disclosure is first described briefly below.

In a 5G system, a dual connectivity (DC) architecture is used, two cell groups, that is, a master cell group (MCG) and a secondary cell group (SCG) are included, and a PDCP duplication function is supported. Therefore, different bearer types are generated, and mainly include:

MCG bearer: a PDCP entity, a radio link control (RLC) entity, and a medium access control (MAC) entity corresponding to this bearer all belong to the MCG.

SCG bearer: a PDCP entity, an RLC entity, and a MAC entity corresponding to this bearer all belong to the SCG.

Split bearer: a PDCP entity corresponding to this bearer is in one cell group, and two RLC entities and two MAC entities corresponding to this bearer are in different cell groups.

Duplicate bearer: one PDCP entity, two RLC entities, and one MAC entity corresponding to this bearer are in one cell group.

Figure 1:
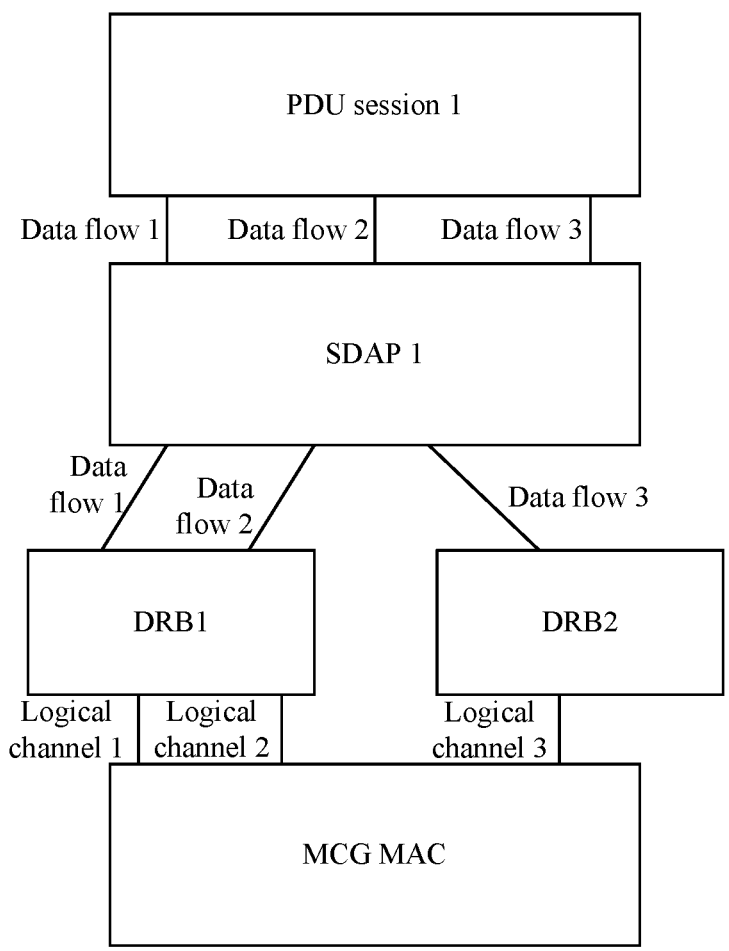
FIG. 1 is a first schematic diagram of a data mapping flow.
Figure 2:
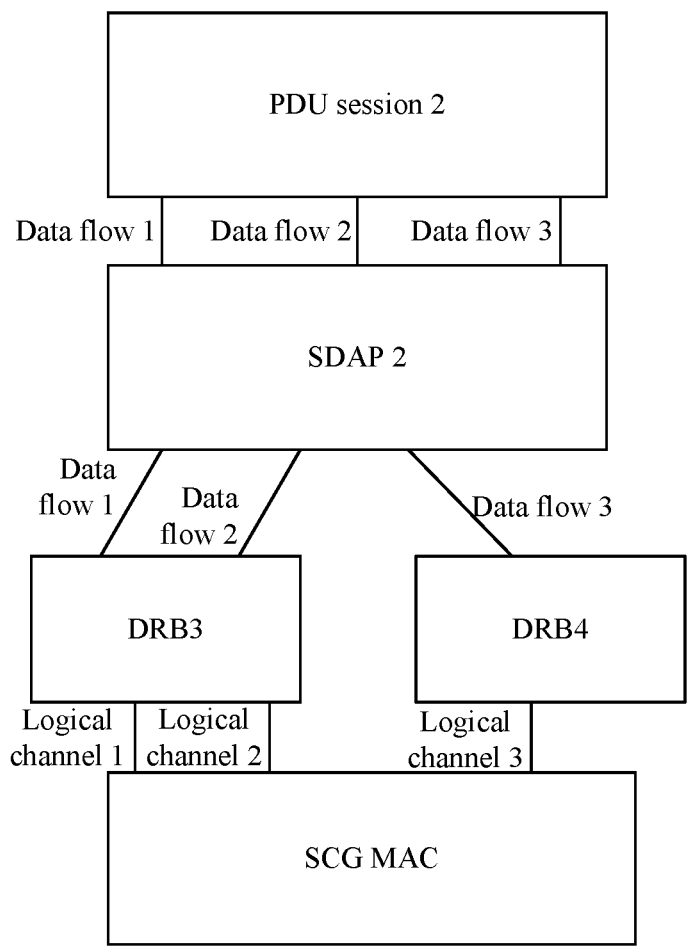
FIG. 2 is a second schematic diagram of a data mapping flow.
Figure 3:
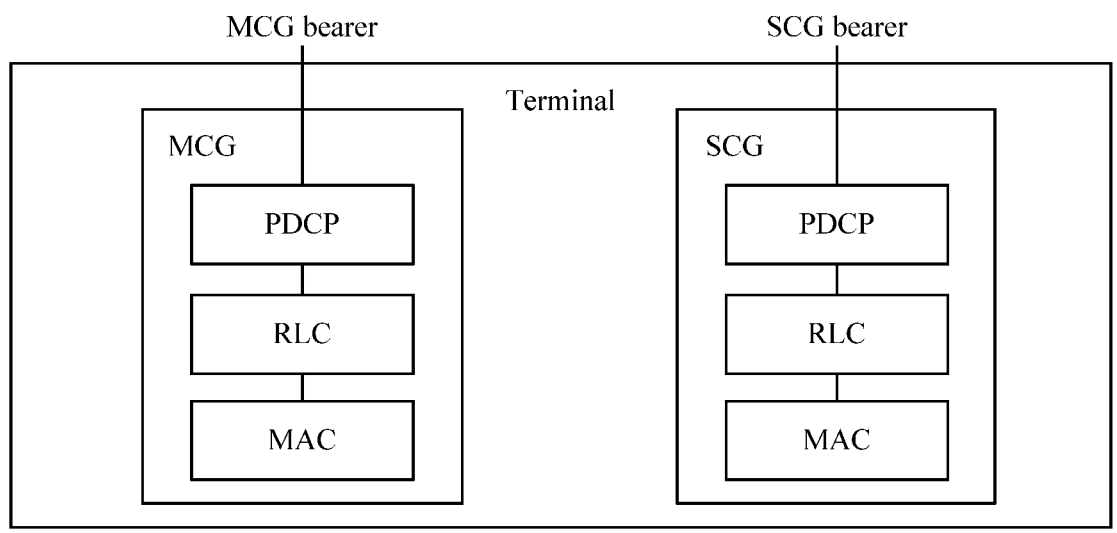
FIG. 3 is a schematic diagram of a correspondence between a protocol entity of an MCG bearer type and a cell group.
Figure 4:
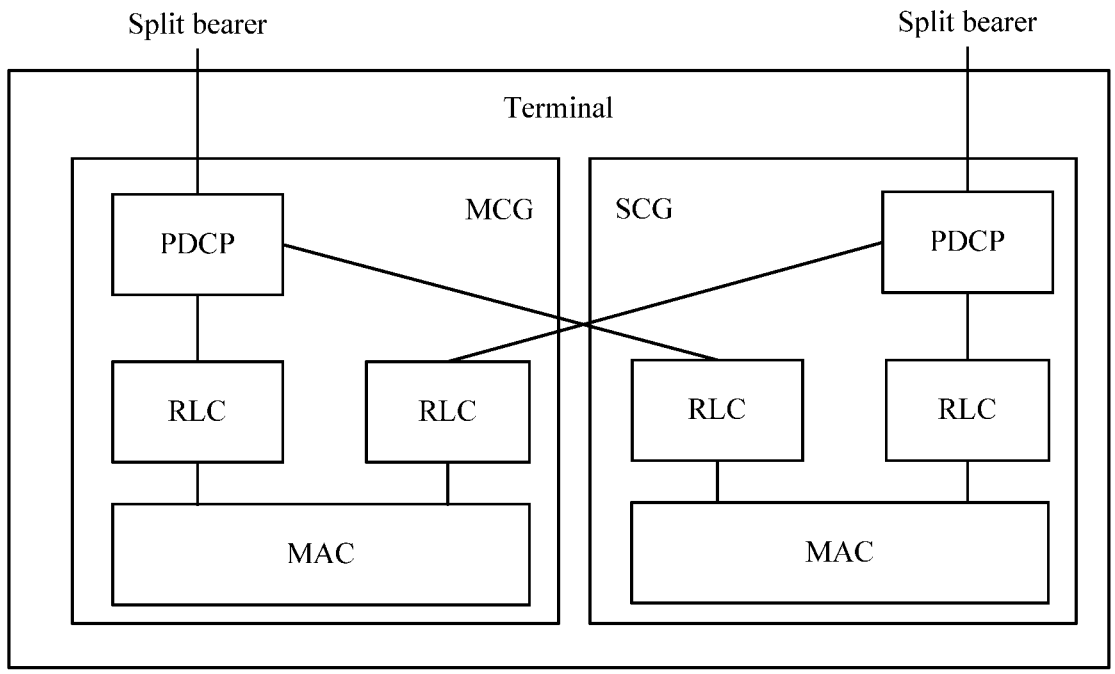
FIG. 4 is a schematic diagram of a correspondence between a protocol entity of a split bearer type and a cell group.
Figure 5:
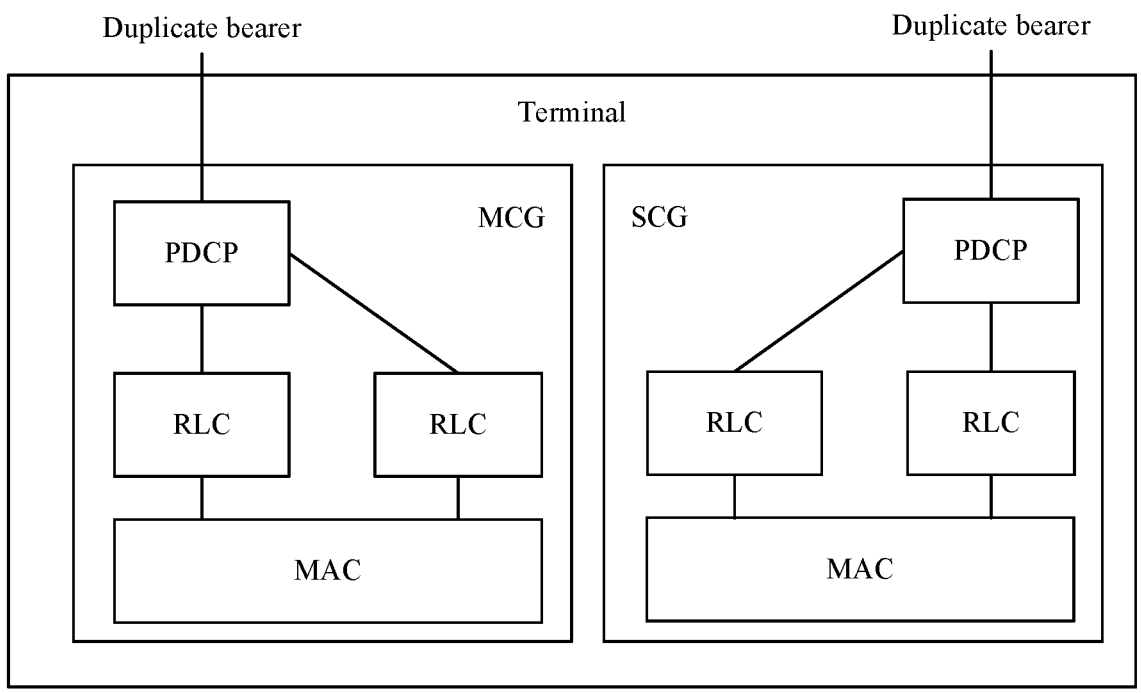
FIG. 5 is a schematic diagram of a correspondence between a protocol entity of a duplicate bearer type and a cell group.

A correspondence between a protocol entity of each bearer type and a cell group is shown in FIG. 3 to FIG. 5.

The present disclosure resolves the following technical problem: One DRB may include a plurality of data flows in a 5G system, and the data flow can be recognized only at an SDAP layer. As a result, when losing a PDCP sequence number, a PDCP layer of a network side cannot determine a data flow of a lost packet, and consequently cannot accurately collect statistics on a data loss ratio of an uplink service.

Figure 6:
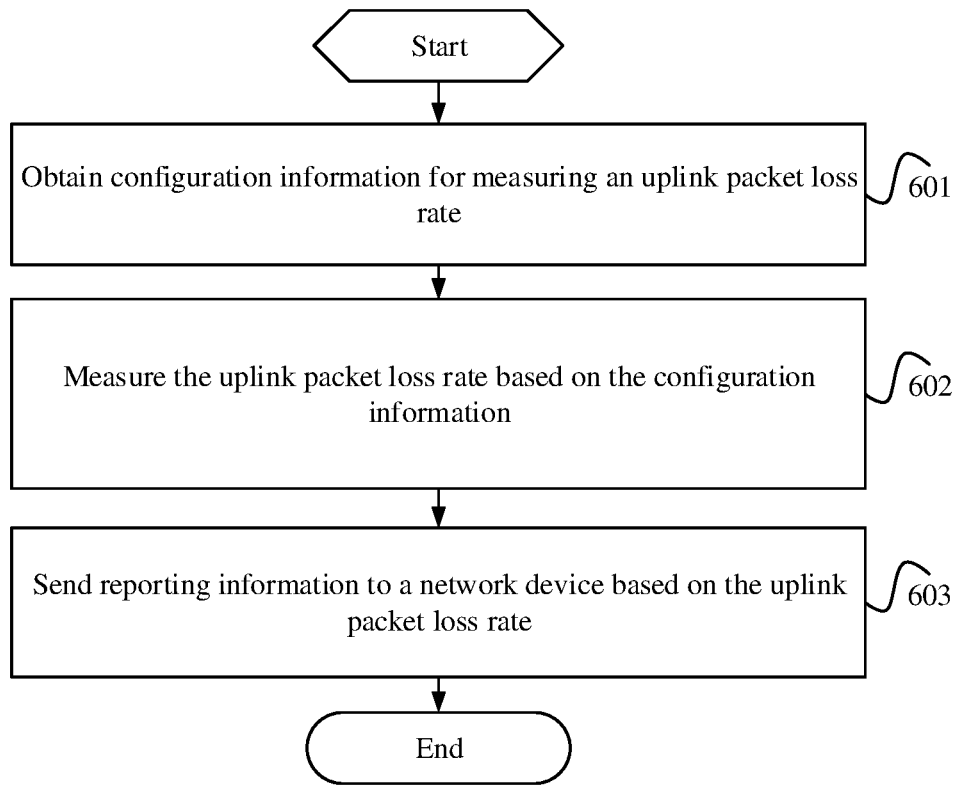
FIG. 6 is a schematic flowchart of a method for measuring a packet loss rate according to an embodiment of the present disclosure.

As shown in FIG. 6, an embodiment of the present disclosure provides a method for measuring a packet loss rate, applied to a terminal, and including:

Step 601: Obtain configuration information for measuring an uplink packet loss rate.

The configuration information includes: measurement time window information, measurement service information, and condition information for triggering reporting of an uplink packet loss rate measurement.

Step 602: Measure the uplink packet loss rate based on the configuration information.

Step 603: Send reporting information to a network device based on the uplink packet loss rate.

In this embodiment of the present disclosure, the uplink packet loss rate is obtained on a terminal side, and the reporting information is sent to the network device based on the uplink packet loss rate, to ensure that the network device can obtain a relatively accurate uplink packet loss rate, and ensure communication reliability.

Further, a specific implementation of step 601 is: obtaining the configuration information via at least one of a manner of configuring by the network device or a manner of specifying by a protocol.

It should be noted that, because the configuration information includes three types of information: the measurement time window information, the measurement service information, and the condition information for triggering reporting of an uplink packet loss rate measurement, the three types of information may all be delivered by the network device; or the three types of information may all be directly obtained by the terminal in the manner of stipulating by a protocol; or some of the three types of information are delivered by the network device, and the other information is stipulated by a protocol, for example, the measurement time window information is delivered by the network device, and the measurement service information and the condition information for triggering reporting of an uplink packet loss rate measurement are stipulated by a protocol.

Specifically, it should also be noted that, the measurement time window information may include a length of a time window for measurement, for example, the length of the time window is 100 milliseconds.

The measurement service information includes at least one of a data flow identifier, a quality of service type identifier (for example, a fifth-generation quality of service identifier (that is, 5Qi identifier)), a protocol data unit session identifier, a cell group identifier (for example, an MCG identifier or an SCG identifier), a data radio bearer identifier, or a logical channel identifier.

The condition information for triggering reporting of an uplink packet loss rate measurement includes one or more of the following various information:

preset threshold information about a packet loss rate threshold that triggers reporting, where herein, it means that when the packet loss rate reaches the preset threshold, reporting of the uplink packet loss rate is triggered, for example, the preset threshold is $10^{-3}$; and period information about reporting of a packet loss rate measurement, where herein, it means a packet loss rate reporting period, for example, the period is reporting once every 100 milliseconds.

Further, a specific implementation of step 602 is:

determining a quantity of packets that are sent in an uplink direction and that are lost and a quantity of packets that are sent in the uplink direction within a preset time; and obtaining the uplink packet loss rate based on the quantity of packets that are sent in the uplink direction and that are lost and the quantity of packets that are sent in the uplink direction.

It should be noted that, the preset time may be a unit time. During specific implementation of step 602, the quantity of packets that are sent in an uplink direction and that are lost and the quantity of packets that are sent in the uplink direction are each obtained through measurement within the preset time; and then the uplink packet loss rate is obtained based on the obtained two types of data. Specifically, the uplink packet loss rate is a ratio of the quantity of packets that are sent in the uplink direction and that are lost to the quantity of packets that are sent in the uplink direction.

Specifically, the packets that are sent in the uplink direction include: a packet that is sent in the uplink direction and that is lost and a packet that is successfully sent in the uplink direction.

For example, the uplink packet loss rate is obtained in the following manner:

obtaining the uplink packet loss rate based on a formula $$M(T, 5qi) = \left\lfloor \frac{Dloss(T, 5qi) * 1000000}{N(T, 5qi) + Dloss(T, 5qi)} \right\rfloor,$$

where

M(T,5qi) is an uplink packet loss rate within a time T; Dloss(T,5qi) is a quantity of packets that are sent in the uplink direction and that are lost within the time T; N(T,5qi) is a quantity of packets that are successfully sent in the uplink direction within the time T; T is the preset time for performing measurement; $\lfloor \; \rfloor$ is floor(x), and N(T,5qi)+Dloss (T,5qi) is a quantity of packets that are sent in the uplink direction.

Further, the packets that are sent in the uplink direction and that are lost include one or more of the following various information:

A1: an uplink packet that is transmitted over an air interface and for which a success acknowledgement has not been received;

A2: an uplink packet that is transmitted over an air interface and for which a failure acknowledgement has been received; and A3: an uplink packet that is transmitted over an air interface and that is determined as a receiving failure.

It should be noted that, the uplink packet determined as a receiving failure means: an uplink packet that is unsuccessfully received and that is obtained based on a determining condition. For example, the terminal starts a timer after the uplink packet is sent, to determine whether the uplink packet is unsuccessfully received, and if success information of the network device is not received when the timer expires, it is considered that the packet is unsuccessfully sent, that is, the network device has unsuccessfully received the uplink packet.

Further, the packet that is sent in the uplink direction and that is lost refers to an uplink packet of which at least a part of data is lost. For example, a PDCP sequence number of a packet of a data flow is PDCN SN 1, and a segment of the packet at an RLC layer is lost during transmission. In this case, it may be determined that the packet of the data flow is lost during transmission.

Further, the packets that are successfully sent in the uplink direction include one or more of the following various information:

B1: an uplink packet that is transmitted over an air interface and for which a failure acknowledgement has not been received;

B2: an uplink packet that is transmitted over an air interface and for which a success acknowledgement has been received; and B3: an uplink packet that is transmitted over an air interface and that is determined as a receiving success.

It should be noted that, the uplink packet determined as a receiving success means: an uplink packet that is successfully received and that is obtained based on a determining condition. For example, the terminal starts a timer after the uplink packet is sent, to determine whether the uplink packet is successfully received, and if failure acknowledgement information of the network device is not received when the timer expires, it is considered that the packet is successfully sent, that is, the network device has successfully received the uplink packet.

Further, the packet that is successfully sent in the uplink direction refers to an uplink packet of which at least a part of data is successfully received. For example, a PDCP sequence number of a packet of a data flow is PDCN SN 1, and two segments of the packet are transmitted at an RLC layer. In this case, when both the RLC segments are successfully transmitted, it may be determined that the packet of the data flow is successfully sent (or received).

It should also be noted that, the uplink packet loss rate in this embodiment of the present disclosure includes one or more of the following various information:

C1: an uplink air interface packet loss rate of the terminal;

C2: an uplink air interface packet loss rate of a preset fifth-generation quality of service identifier;

C3: an uplink air interface packet loss rate of a first preset bearer type, for example, the first preset bearer type may be an MCG bearer and an SCG bearer; or the first preset bearer type may be a split bearer; or the first preset bearer type may be a duplicate bearer;

C4: an uplink air interface packet loss rate of a sending path of a second preset bearer type, for example, the sending path of the second preset bearer type may be each path of the split bearer; or the sending path of the second preset bearer type may be each path of a duplicate bearer;

C5: an uplink air interface packet loss rate of a preset bearer; and

C6: an uplink air interface packet loss rate of a preset data flow.

It should also be noted that, the uplink packet in this embodiment of the present disclosure includes one or more of the following various information:

D1: a service data adaptation protocol service data unit (SDAP SDU);

D2: a service data adaptation protocol protocol data unit (SDAP PDU);

D3: a packet data convergence protocol service data unit (PDCP SDU), for example, the PDCP SDU is used for a bearer without a SDAP entity;

D4: a packet data convergence protocol protocol data unit (PDCP PDU), for example, the PDCP PDU is used for a bearer without an SDAP entity;

D5: a radio link control service data unit (RLC SDU), for example, the RLC SDU is used on a path on which a split bearer has no PDCP entity;

D6: a radio link control protocol data unit; (RLC PDU), for example, the RLC PDU is used on a path on which a split bearer has no PDCP entity;

D7: a medium access control service data unit (MAC SDU), for example, the MAC SDU is used on a path on which a split bearer has no RLC entity; and D8: a medium access control protocol data unit (MAC PDU), for example, the MAC PDU is used on a path on which a split bearer has no RLC entity.

Further, an implementation of step 603 is:

sending the reporting information to the network device when the condition information for triggering reporting of an uplink packet loss rate measurement in the configuration information is met.

For example, when the packet loss rate reaches the preset threshold, sending of the reporting information is triggered.

Specifically, the reporting information includes at least one of an uplink packet loss rate, a data flow identifier, a quality of service type identifier, a protocol data unit session identifier, a cell group identifier, a data radio bearer identifier, or a logical channel identifier.

It should also be noted that, when receiving the reporting information sent by the terminal, the network device may adjust a scheduling policy based on the reporting information, for example, reduce a modulation and coding rate of uplink data of the terminal, improve uplink transmit power, and increase packet retransmissions, to reduce the uplink packet loss rate of the terminal.

It should be noted that, according to the method in this embodiment of the present disclosure, it can be ensured that the network device obtains a relatively accurate uplink packet loss rate in a 5G system, so that the packet can be sent on a better path and channel, or a radio resource configuration is modified to reduce a packet loss rate, to improve packet sending reliability, thereby ensuring network communication reliability.

Figure 7:
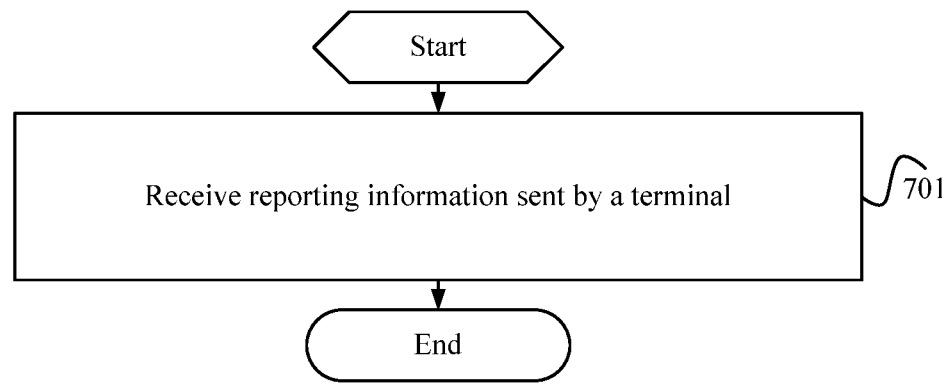
FIG. 7 is a schematic flowchart of a method for obtaining a packet loss rate according to an embodiment of the present disclosure.

Specifically, as shown in FIG. 7, FIG. 7 is a schematic flowchart of a method for obtaining a packet loss rate according to an embodiment of the present disclosure. The method for obtaining a packet loss rate is applied to a network device, and includes:

Step 701: Receive reporting information sent by a terminal.

The reporting information is obtained and sent by the terminal after the terminal measures an uplink packet loss rate based on configuration information, and the configuration information includes: measurement time window information, measurement service information, and condition information for triggering reporting of an uplink packet loss rate measurement.

Further, the receiving reporting information sent by a terminal includes:

receiving the reporting information fed back by the terminal when the condition information for triggering reporting of an uplink packet loss rate measurement in the configuration information is met.

Specifically, the reporting information includes at least one of an uplink packet loss rate, a data flow identifier, a quality of service type identifier, a protocol data unit session identifier, a cell group identifier, a data radio bearer identifier, or a logical channel identifier.

Optionally, before the receiving reporting information sent by a terminal, the method further includes:

sending at least one of the measurement time window information, the measurement service information, or the condition information for triggering reporting of an uplink packet loss rate measurement in the configuration information to the terminal.

It should be noted that all descriptions of the network device in the foregoing embodiment are applicable to the embodiment of the method for obtaining a packet loss rate applied to the network device, and the same technical effect thereof can also be achieved.

Figure 8:
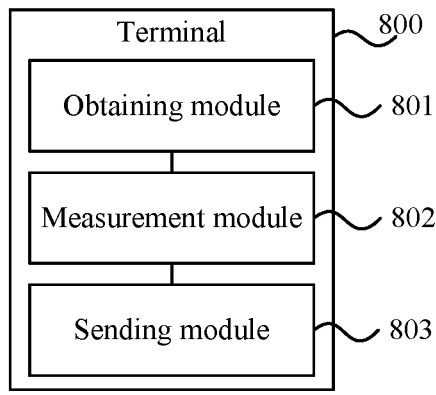
FIG. 8 is a schematic diagram of modules of a terminal according to an embodiment of the present disclosure.

As shown in FIG. 8, an embodiment of the present disclosure provides a terminal 800, including:

an obtaining module 801, configured to obtain configuration information for measuring an uplink packet loss rate, where the configuration information includes: measurement time window information, measurement service information, and condition information for triggering reporting of an uplink packet loss rate measurement;

a measurement module 802, configured to measure the uplink packet loss rate based on the configuration information; and a sending module 803, configured to send reporting information to a network device based on the uplink packet loss rate.

Optionally, the obtaining module 801 is configured to:

obtain the configuration information via at least one of a manner of configuring by the network device or a manner of specifying by a protocol.

Specifically, the measurement service information includes at least one of a data flow identifier, a quality of service type identifier, a protocol data unit session identifier, a cell group identifier, a data radio bearer identifier, or a logical channel identifier.

Specifically, the condition information for triggering reporting of an uplink packet loss rate measurement includes: at least one of preset threshold information about a packet loss rate threshold that triggers reporting, or period information about reporting of a packet loss rate measurement.

Further, the measurement module 802 includes:

a determining unit, configured to determine a quantity of packets that are sent in an uplink direction and that are lost and a quantity of packets that are sent in the uplink direction within a preset time; and an obtaining unit, configured to obtain the uplink packet loss rate based on the quantity of packets that are sent in the uplink direction and that are lost and the quantity of packets that are sent in the uplink direction.

Specifically, the uplink packet loss rate is a ratio of the quantity of packets that are sent in the uplink direction and that are lost to the quantity of packets that are sent in the uplink direction, and the packets that are sent in the uplink direction include: a packet that is sent in the uplink direction and that is lost and a packet that is successfully sent in the uplink direction.

Specifically, the packets that are sent in the uplink direction and that are lost include:

at least one of an uplink packet that is transmitted over an air interface and for which a success acknowledgement has not been received, an uplink packet that is transmitted over an air interface and for which a failure acknowledgement has been received, or an uplink packet that is transmitted over an air interface and that is determined as a receiving failure.

Specifically, the packet that is sent in the uplink direction and that is lost is an uplink packet of which at least a part of data is lost.

Specifically, the packet that is successfully sent in the uplink direction includes:

at least one of an uplink packet that is transmitted over an air interface and for which a failure acknowledgement has not been received, an uplink packet that is transmitted over an air interface and for which a success acknowledgement has been received, or an uplink packet that is transmitted over an air interface and that is determined as a receiving success.

Specifically, the packet that is successfully sent in the uplink direction is an uplink packet of which at least a part of data is successfully received.

Specifically, the uplink packet loss rate includes:

at least one of an uplink air interface packet loss rate of the terminal, an uplink air interface packet loss rate of a preset fifth-generation quality of service identifier, an uplink air interface packet loss rate of a first preset bearer type, an uplink air interface packet loss rate of a sending path of a second preset bearer type, an uplink air interface packet loss rate of a preset bearer, or an uplink air interface packet loss rate of a preset data flow.

Specifically, the uplink packet includes:

at least one of a service data adaptation protocol service data unit, a service data adaptation protocol protocol data unit, a packet data convergence protocol service data unit, a packet data convergence protocol protocol data unit, a radio link control service data unit, a radio link control protocol data unit, a medium access control service data unit, or a medium access control protocol data unit.

Optionally, the sending module is configured to:

send the reporting information to the network device when the condition information for triggering reporting of an uplink packet loss rate measurement in the configuration information is met.

Specifically, the reporting information includes at least one of an uplink packet loss rate, a data flow identifier, a quality of service type identifier, a protocol data unit session identifier, a cell group identifier, a data radio bearer identifier, or a logical channel identifier.

It should be noted that the terminal in this embodiment is the terminal corresponding to the method for measuring a packet loss rate applied to a terminal side, all implementations of the foregoing embodiment are applicable to this embodiment of the terminal, and the same technical effect thereof can also be achieved.

Figure 9:
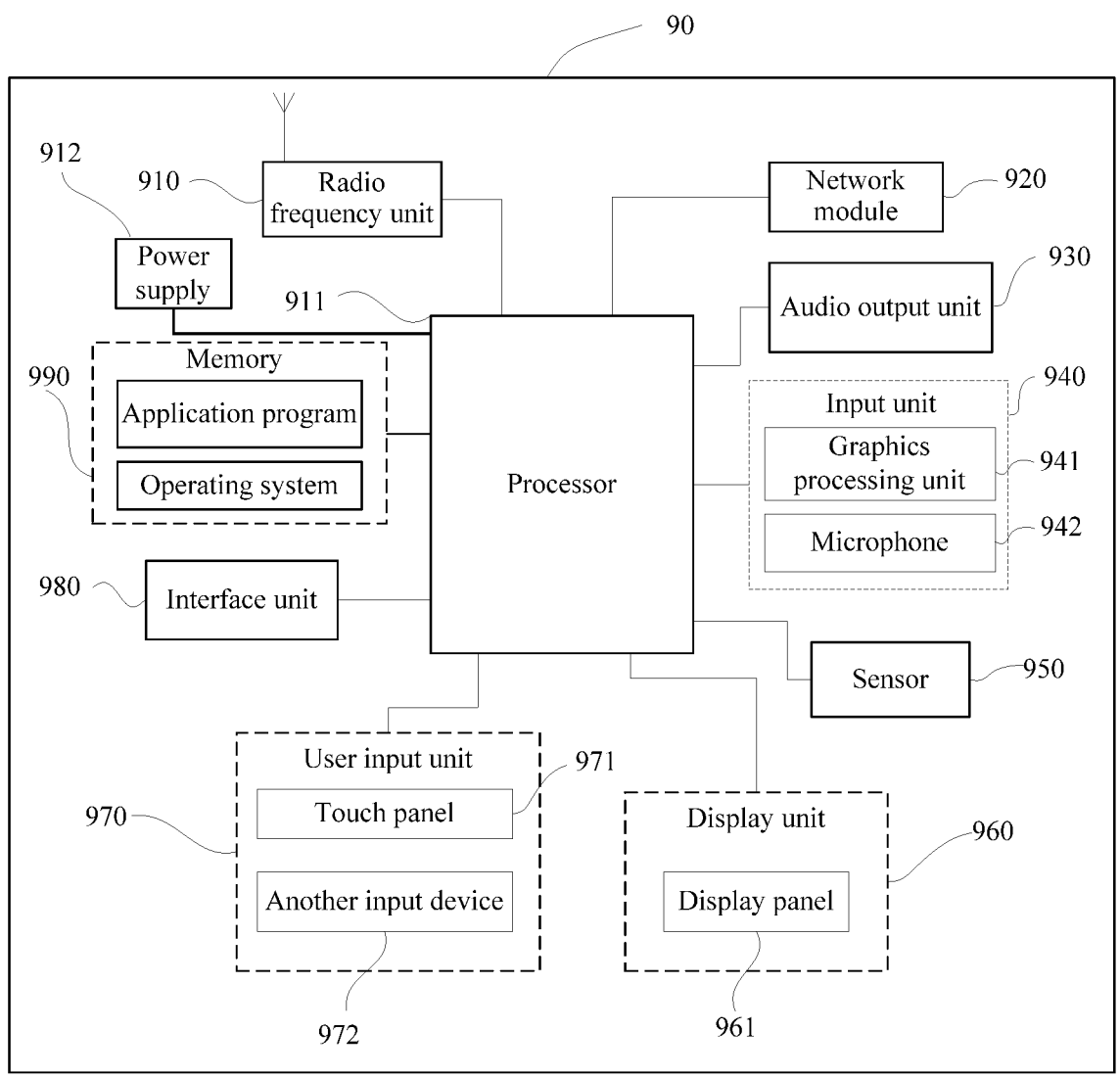
FIG. 9 is a structural block diagram of a terminal according to an embodiment of the present disclosure.

FIG. 9 is a schematic diagram of a hardware structure of a terminal 90 according to an embodiment of the present disclosure.

The terminal 90 includes, but is not limited to: a radio frequency unit 910, a network module 920, an audio output unit 930, an input unit 940, a sensor 950, a display unit 960, a user input unit 970, an interface unit 980, a memory 990, a processor 911, and a power supply 912. A person skilled in the art can understand that the structure of the terminal shown in FIG. 9 does not constitute a limitation on the terminal, and the terminal may include more or fewer components than those shown in the figure, or combine some components, or have different component arrangements. In this embodiment of the present disclosure, the terminal includes, but is not limited to, a mobile phone, a tablet computer, a notebook computer, a palmtop computer, a vehicle-mounted terminal, a wearable device, a pedometer, or the like.

The processor 911 is configured to: obtain configuration information for measuring an uplink packet loss rate, where the configuration information includes: measurement time window information, measurement service information, and condition information for triggering reporting of an uplink packet loss rate measurement; and measure the uplink packet loss rate based on the configuration information. The radio frequency unit 910 is configured to send reporting information to the network device based on the uplink packet loss rate.

The terminal in this embodiment of the present disclosure obtains the uplink packet loss rate based on the configuration information for measuring the uplink packet loss rate, and sends the reporting information to the network device based on the uplink packet loss rate, to ensure that the network device can obtain a relatively accurate uplink packet loss rate, and ensure communication reliability.

It should be understood that in this embodiment of the present disclosure, the radio frequency unit 910 may be configured to receive and send a signal in a process of receiving and sending information or calling. Specifically, the radio frequency unit 910 receives downlink data from a network device for processing by the processor 911, and sends uplink data to the network device. Generally, the radio frequency unit 910 includes, but is not limited to, an antenna, at least one amplifier, a transceiver, a coupler, a low noise amplifier, a duplexer, and the like. In addition, the radio frequency unit 910 can further communicate with a network and another device via a wireless communication system.

The terminal provides a user with wireless broadband Internet access through the network module 920, for example, helps the user send and receive emails, browse web pages, and access streaming media.

The audio output unit 930 can convert audio data received by the radio frequency unit 910 or the network module 920 or stored in the memory 990 into an audio signal, and output the audio signal as sound. Moreover, the audio output unit 930 may further provide an audio output (for example, call signal receiving sound and message receiving sound) related to a specific function performed by the terminal 90. The audio output unit 930 includes a speaker, a buzzer, a receiver, and the like.

The input unit 940 is configured to receive an audio signal or a video signal. The input unit 940 may include a graphics processing unit (GPU) 941 and a microphone 942. The graphics processing unit 941 processes image data of a static image or a video obtained by an image capturing apparatus (such as, a camera) in a video capturing mode or an image capturing mode. A processed image frame can be displayed on the display unit 960. The image frame processed by the graphics processing unit 941 can be stored in the memory 990 (or another storage medium) or sent by the radio frequency unit 910 or the network module 920. The microphone 942 can receive sound, and can process such sound into audio data. The processed audio data may be converted in a telephone call mode into a format that can be sent by the radio frequency unit 910 to a mobile communications network device for output.

The terminal 90 further includes at least one sensor 950, such as a light sensor, a motion sensor, and other sensors. Specifically, the light sensor includes an ambient light sensor and a proximity sensor, where the ambient light sensor can adjust brightness of the display panel 961 according to brightness of ambient light, and the proximity sensor can turn off the display panel 961 and/or backlight when the terminal 90 moves towards the ear. As a type of motion sensor, an accelerometer sensor can detect accelerations in all directions (generally three axes), and can detect the magnitude and direction of gravity when it is still. The accelerometer sensor may be configured to identify a terminal posture (for example, switching between a landscape mode and a portrait mode, related games, and magnetometer posture calibration), perform vibration identification-related functions (for example, a pedometer and a knock), and the like. The sensor 950 may further include a fingerprint sensor, a pressure sensor, an iris sensor, a molecular sensor, a gyroscope, a barometer, a hygrometer, a thermometer, an infrared sensor, and the like. Details are not described herein again.

The display unit 960 is configured to display information input by a user or information provided to a user. The display unit 960 may include the display panel 961, and the display panel 961 may be configured in a form of a liquid crystal display (LCD), an organic light-emitting diode (OLED), or the like.

The user input unit 970 can be configured to receive inputted digit or character information, and generate key signal inputs related to user settings and function control of the terminal. Specifically, the user input unit 970 includes a touch panel 971 and another input device 972. The touch panel 971, also called a touch screen, can collect a touch operation of the user on or near the touch panel 971 (For example, an operation performed by the user with any suitable object or accessory such as a finger or a stylus on or near the touch panel 971). The touch panel 971 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into contact coordinates, sends the contact coordinates to the processor 911, and receives and executes a command sent by the processor 911. In addition, the touch panel 971 can be implemented by various types such as a resistive type, a capacitive type, an infrared type, or a surface acoustic wave type. In addition to the touch panel 971, the user input unit 970 may also include the another input device 972. Specifically, the another input device 972 may include, but is not limited to, a physical keyboard, functional keys (for example, a volume control key and a switch key), a trackball, a mouse, and a joystick. Details are not described herein again.

Further, the touch panel 971 may cover the display panel 961. When the touch panel 971 detects a touch operation on or near the touch panel 971, the touch operation is transmitted to the processor 911 to determine a type of a touch event, and then the processor 911 provides corresponding visual output on the display panel 961 according to the type of the touch event. Although the touch panel 971 and the display panel 961 are two independent components for implementing input and output functions of the terminal in FIG. 9, in some embodiments, the touch panel 971 and the display panel 961 may be integrated to implement the input and output functions of the terminal. Details are not limited herein.

The interface unit 980 is an interface connecting an external apparatus to the terminal 90. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 980 may be configured to receive an input (for example, data information and power) from an external apparatus and transmit the received input to one or more elements within the terminal 90, or may be configured to transmit data between the terminal 90 and the external apparatus.

The memory 990 may be configured to store a software program and various data. The memory 990 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 990 may include a high-speed random access memory or a nonvolatile memory, for example, at least one disk storage device, a flash memory, or another volatile solid-state storage device.

The processor 911 is a control center of the terminal. The processor 911 uses various interfaces and lines to connect the various parts of the entire terminal, and performs various functions of the terminal and processes data by running or executing software programs and/or modules stored in the memory 990 and invoking data stored in the memory 990, to monitor the terminal as a whole. The processor 911 may include one or more processing units. Optionally, the processor 911 may integrate an application processor and a modem processor. The application processor mainly deals with an operating system, a user interface, an application program, and the like. The modem processor mainly deals with wireless communication. It can be understood that the modem processor may alternatively not be integrated into the processor 911.

The terminal 90 may further include a power supply 912 (for example, a battery) that supplies power to various components. Optionally, the power supply 912 may be logically connected to the processor 911 through a power supply management system, to perform functions of managing charging, discharging, and power consumption through the power supply management system.

In addition, the terminal 90 includes some functional modules not shown. Details are not described herein again.

Optionally, an embodiment of the present disclosure further provides a terminal, including the processor 911, the memory 990, and a computer program stored in the memory 990 and executable on the processor 911, where when the computer program is executed by the processor 911, the processes of the foregoing embodiment of the method for measuring a packet loss rate applied to a terminal side are performed, and the same technical effects can be achieved. To avoid repetition, details are not described herein again.

An embodiment of the present disclosure further provides a computer readable storage medium, where the computer readable storage medium stores a computer program, and when the computer program is executed by a processor, the processes of the foregoing embodiment of the method for measuring a packet loss rate applied to a terminal side are performed, and the same technical effects can be achieved. To avoid repetition, details are not described herein again. The computer readable storage medium is, for example, a read-only memory (Read-Only Memory, ROM), a random access memory (Random Access Memory, RAM), a magnetic disk, or an optical disc.

Figure 10:
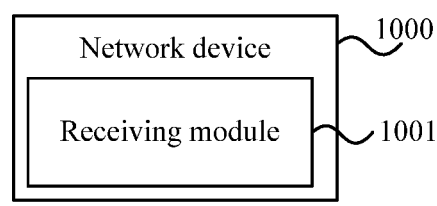
FIG. 10 is a schematic diagram of modules of a network device according to an embodiment of the present disclosure.

As shown in FIG. 10, an embodiment of the present disclosure further provides a network device 1000, including:

a receiving module 1001, configured to receive reporting information sent by a terminal, where the reporting information is obtained and sent by the terminal after the terminal measures an uplink packet loss rate based on configuration information, and the configuration information includes: measurement time window information, measurement service information, and condition information for triggering reporting of an uplink packet loss rate measurement.

Further, the receiving module 1001 is configured to:

receive the reporting information fed back by the terminal when the condition information for triggering reporting of an uplink packet loss rate measurement in the configuration information is met.

Specifically, the reporting information includes at least one of an uplink packet loss rate, a data flow identifier, a quality of service type identifier, a protocol data unit session identifier, a cell group identifier, a data radio bearer identifier, or a logical channel identifier.

Optionally, the network device further includes:

a configuration sending module, configured to send at least one of the measurement time window information, the measurement service information, or the condition information for triggering reporting of an uplink packet loss rate measurement in the configuration information to the terminal.

It should be noted that the network device in this embodiment is the network device corresponding to the method for obtaining a packet loss rate applied to a network device side, all implementations of the foregoing embodiment are applicable to this embodiment of the network device, and the same technical effect thereof can also be achieved.

An embodiment of the present disclosure further provides a network device, including: a memory, a processor, and a computer program stored in the memory and executable on the processor, where when the computer program is executed by the processor, processes in the embodiment of the method for obtaining a packet loss rate are implemented, and the same technical effect can be achieved. To avoid repetition, details are not described herein again.

An embodiment of the present disclosure further provides a computer readable storage medium, where the computer readable storage medium stores a computer program, and when the computer program is executed by a processor, the processes of the embodiment of the method for obtaining a packet loss rate are implemented, and the same technical effects can be achieved. To avoid repetition, details are not described herein again. The computer readable storage medium is, for example, a read-only memory (ROM), a random access memory (RAM), a magnetic disk, or an optical disc.

Figure 11:
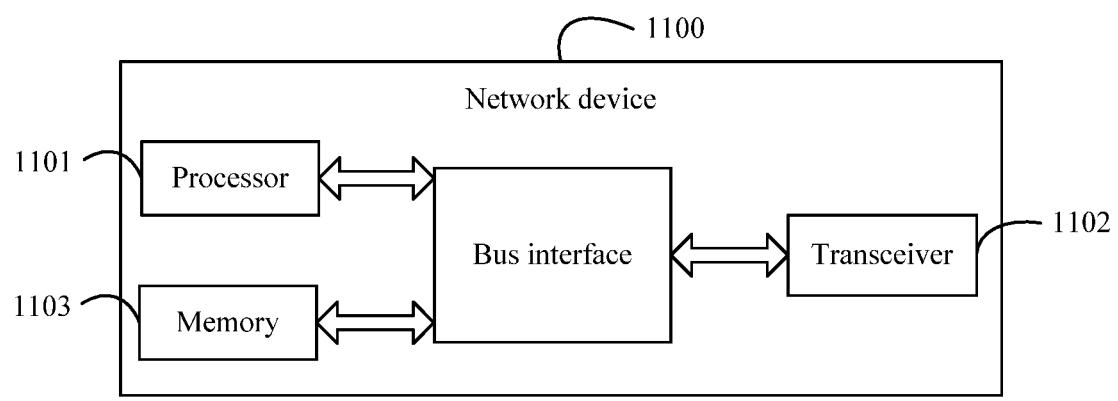
FIG. 11 is a structural block diagram of a network device according to an embodiment of the present disclosure.

FIG. 11 is a structural diagram of a network device according to an embodiment of the present disclosure. The network device can implement details of the method for obtaining a packet loss rate applied to a network device side, and achieve the same effect. As shown in FIG. 11, the network device 1100 includes: a processor 1101, a transceiver 1102, a memory 1103, and a bus interface.

The processor 1101 is configured to read a program in the memory 1103, to perform the following process:

receiving, by using the transceiver 1102, reporting information sent by a terminal, where the reporting information is obtained and sent by the terminal after the terminal measures an uplink packet loss rate based on configuration information, and the configuration information includes: measurement time window information, measurement service information, and condition information for triggering reporting of an uplink packet loss rate measurement.

In FIG. 11, a bus architecture may include any quantity of interconnected buses and bridges. Specifically, various circuits of one or more processors represented by the processor 1101 and a memory represented by the memory 1103 are interconnected. The bus architecture may further connect together various other circuits of a peripheral device, a voltage stabilizer, a power management circuit, and the like, which are well known in this field and are not further described herein. The bus interface provides an interface. The transceiver 1102 may be a plurality of components. To be specific, the transceiver 1102 includes a transmitter and a receiver, and provides a unit configured to communicate with various other apparatuses on a transmission medium.

The processor 1101 is responsible for management and general processing of the bus architecture. The memory 1103 can store data used by the processor 1101 during operation execution.

Optionally, the processor 1101 is configured to read a program in the memory 1103, to further perform the following process:

receiving, by using the transceiver 1102, the reporting information fed back by the terminal when the condition information for triggering reporting of an uplink packet loss rate measurement in the configuration information is met.

Specifically, the reporting information includes at least one of an uplink packet loss rate, a data flow identifier, a quality of service type identifier, a protocol data unit session identifier, a cell group identifier, a data radio bearer identifier, or a logical channel identifier.

Optionally, the processor 1101 is configured to read a program in the memory 1103, to further perform the following process:

sending, by using the transceiver 1102, at least one of the measurement time window information, the measurement service information, or the condition information for triggering reporting of an uplink packet loss rate measurement in the configuration information to the terminal.

The network device may be a base transceiver station (BTS) in global system for mobile communications (GSM) or code division multiple access (CDMA), or may be a NodeB (NB) in wideband code division multiple access (WCDMA), or may be an evolved NodeB (eNB or eNodeB) in LTE, or a relay station or an access point, or a base station in a future 5G network. This is not limited herein.

The optional implementations of the present disclosure are described above. It should be noted that persons of ordinary skill in the art may further make several improvements and refinements without departing from the principles described in the present disclosure, and these improvements and refinements also fall within the protection scope of the present disclosure.

What is claimed is:

1. A method for measuring a packet loss rate, applied to a terminal, and comprising:
   obtaining configuration information for measuring an uplink packet loss rate, wherein the configuration information comprises: measurement time window information, measurement service information, and condition information for triggering reporting of an uplink packet loss rate measurement;
   measuring the uplink packet loss rate based on the configuration information; and
   sending reporting information to a network device based on the uplink packet loss rate;
   wherein the measuring the uplink packet loss rate comprises:
   determining a quantity of packets that are sent in an uplink direction and that are lost and a quantity of packets that are sent in the uplink direction within a preset time; and
   obtaining the uplink packet loss rate based on the quantity of packets that are sent in the uplink direction and that are lost and the quantity of packets that are sent in the uplink direction;
   wherein the uplink packet loss rate is a ratio of the quantity of packets that are sent in the uplink direction and that are lost to the quantity of packets that are sent in the uplink direction, and the packets that are sent in the uplink direction comprise: a packet that is sent in the uplink direction and that is lost and a packet that is successfully sent in the uplink direction;
   wherein the measurement service information comprises at least one of a data flow identifier, a protocol data unit session identifier, a cell group identifier, or a logical channel identifier;
   wherein the uplink packet loss rate comprises an uplink air interface packet loss rate of a preset data flow.

2. The method for measuring a packet loss rate according to claim 1, wherein the measurement service information further comprises at least one of a quality of service type identifier, or a data radio bearer identifier;
   and/or,
   the condition information for triggering reporting of an uplink packet loss rate measurement comprises: at least one of preset threshold information about a packet loss rate threshold that triggers reporting, or period information about reporting of a packet loss rate measurement.

3. The method for measuring a packet loss rate according to claim 1, wherein the packets that are sent in the uplink direction and that are lost comprise:
   at least one of an uplink packet that is transmitted over an air interface and for which success acknowledgement has not been received, an uplink packet that is transmitted over an air interface and for which a failure acknowledgement has been received, or an uplink packet that is transmitted over an air interface and that is determined as a receiving failure;
   or,
   the packet that is sent in the uplink direction and that is lost is an uplink packet of which at least a part of data is lost.

4. The method for measuring a packet loss rate according to claim 1, wherein the packet that is successfully sent in the uplink direction comprises:
   at least one of an uplink packet that is transmitted over an air interface and for which failure acknowledgement has not been received, an uplink packet that is transmitted over an air interface and for which a success acknowledgement has been received, or an uplink packet that is transmitted over an air interface and that is determined as a receiving success;
   or,
   the packet that is successfully sent in the uplink direction is an uplink packet of which at least a part of data is successfully received.

5. The method for measuring a packet loss rate according to claim 1, wherein the uplink packet loss rate further comprises:
   at least one of an uplink air interface packet loss rate of the terminal, an uplink air interface packet loss rate of a preset fifth-generation quality of service identifier, an uplink air interface packet loss rate of a first preset bearer type, an uplink air interface packet loss rate of a sending path of a second preset bearer type, or an uplink air interface packet loss rate of a preset bearer.

6. The method for measuring a packet loss rate according to claim 1, wherein the sending reporting information to a network device comprises:
   sending the reporting information to the network device when the condition information for triggering reporting of an uplink packet loss rate measurement in the configuration information is met.

7. A non-transitory computer readable storage medium, storing a computer program, wherein when the computer program is executed by a processor, the steps of the method for measuring a packet loss rate according to claim 1 are performed.

8. A method for obtaining a packet loss rate, applied to a network device, and comprising:
    receiving reporting information sent by a terminal, wherein
    the reporting information is obtained and sent by the terminal after the terminal measures an uplink packet loss rate based on configuration information, and the configuration information comprises: measurement time window information, measurement service information, and condition information for triggering reporting of an uplink packet loss rate measurement;
    wherein the uplink packet loss rate is a ratio of a quantity of packets that are sent in an uplink direction and that are lost within a preset time to a quantity of packets that are sent in the uplink direction within the preset time, and the packets that are sent in the uplink direction comprise: a packet that is sent in the uplink direction and that is lost and a packet that is successfully sent in the uplink direction;
    wherein the measurement service information comprises at least one of a data flow identifier, a protocol data unit session identifier, a cell group identifier, or a logical channel identifier;
    wherein the uplink packet loss rate comprises an uplink air interface packet loss rate of a preset data flow.

9. The method for obtaining a packet loss rate according to claim 8, wherein the receiving reporting information sent by a terminal comprises:
    receiving the reporting information fed back by the terminal when the condition information for triggering reporting of an uplink packet loss rate measurement in the configuration information is met.

10. The method for obtaining a packet loss rate according to claim 8, wherein the reporting information comprises at least one of the uplink packet loss rate, a data flow identifier, a quality of service type identifier, a protocol data unit session identifier, a cell group identifier, a data radio bearer identifier, or a logical channel identifier.

11. The method for obtaining a packet loss rate according to claim 8, before the receiving reporting information sent by a terminal, further comprising:
    sending at least one of the measurement time window information, the measurement service information, or the condition information for triggering reporting of an uplink packet loss rate measurement in the configuration information to the terminal.

12. A network device, comprising: a memory, a processor, and a computer program stored in the memory and executable on the processor, wherein when the computer program is executed by the processor, the method for obtaining a packet loss rate according to claim 8 is performed.

13. The network device according to claim 12, wherein the receiving reporting information sent by a terminal comprises:
    receiving the reporting information fed back by the terminal when the condition information for triggering reporting of an uplink packet loss rate measurement in the configuration information is met.

14. A non-transitory computer readable storage medium, storing a computer program, wherein when the computer program is executed by a processor, the steps of the method for obtaining a packet loss rate according to claim 8 are performed.

15. A terminal, comprising: a memory, a processor, and a computer program stored in the memory and executable on the processor, wherein when the computer program is executed by the processor, following steps are performed:
    obtaining configuration information for measuring an uplink packet loss rate, wherein the configuration information comprises: measurement time window information, measurement service information, and condition information for triggering reporting of an uplink packet loss rate measurement;
    measuring the uplink packet loss rate based on the configuration information; and
    sending reporting information to a network device based on the uplink packet loss rate;
    wherein the measuring the uplink packet loss rate comprises:
    determining a quantity of packets that are sent in an uplink direction and that are lost and a quantity of packets that are sent in the uplink direction within a preset time; and
    obtaining the uplink packet loss rate based on the quantity of packets that are sent in the uplink direction and that are lost and the quantity of packets that are sent in the uplink direction;
    wherein the uplink packet loss rate is a ratio of the quantity of packets that are sent in the uplink direction and that are lost to the quantity of packets that are sent in the uplink direction, and the packets that are sent in the uplink direction comprise: a packet that is sent in the uplink direction and that is lost and a packet that is successfully sent in the uplink direction;
    wherein the measurement service information comprises at least one of a data flow identifier, a protocol data unit session identifier, a cell group identifier, or a logical channel identifier;
    wherein the uplink packet loss rate comprises an uplink air interface packet loss rate of a preset data flow.

16. The terminal according to claim 15, wherein the measurement service information further comprises at least one of a quality of service type identifier, or a data radio bearer identifier;
    and/or,
    the condition information for triggering reporting of an uplink packet loss rate measurement comprises: at least one of preset threshold information about a packet loss rate threshold that triggers reporting, or period information about reporting of a packet loss rate measurement.

17. The terminal according to claim 15, wherein the sending reporting information to a network device comprises:
    sending the reporting information to the network device when the condition information for triggering reporting of an uplink packet loss rate measurement in the configuration information is met.

* * * * *